United States Patent [19]

Jaeschke

[11] 4,138,618

[45] Feb. 6, 1979

[54] SPREAD POLE EDDY CURRENT COUPLING

[75] Inventor: Ralph L. Jaeschke, Kenosha, Wis.

[73] Assignee: Eaton Corporation, Cleveland, Ohio

[21] Appl. No.: 792,632

[22] Filed: May 2, 1977

[51] Int. Cl.² ........................................... H02K 49/02
[52] U.S. Cl. .................................................. 310/105
[58] Field of Search ..................... 310/103, 105, 93, 92

[56] References Cited

U.S. PATENT DOCUMENTS

| | | | |
|---|---|---|---|
| 2,465,982 | 3/1949 | Winther et al. | 310/105 |
| 2,470,596 | 5/1949 | Winther et al. | 310/105 X |
| 2,484,138 | 10/1949 | Winther | 310/105 |
| 2,606,948 | 8/1952 | Jaeschke | 310/105 |
| 2,745,974 | 5/1956 | Oetzel | 310/105 X |

*Primary Examiner*—Donovan F. Duggan
*Attorney, Agent, or Firm*—M. L. Union

[57] ABSTRACT

The present invention provides an eddy current coupling including an input member, an output member rotatable relative to the input member and an interdigitated pole assembly attached to the output member for rotation therewith. A field coil is provided surrounding a portion of the interdigitated pole assembly and an inductor member is connected to the input member. The field coil when energized establishes a flux field which couples the pole assembly and the inductor member to thereby couple the input member to the output member. The interdigitated pole assembly includes a core portion which is surrounded by the field coil and a plurality of pole members which extend at one end thereof from said core portion and have a pole face at the opposite end thereof with the pole faces of the plurality of pole members extending in opposite directions in an interdigitated fashion. The numerical value of the total surface area of the plurality of pole faces of each of the pole members is equal to between 2.2 and 3 times the numerical value of the area of the core portion to reduce the flux density at the pole faces to enable the coupling to maximize its torque output under low slip conditions.

12 Claims, 5 Drawing Figures

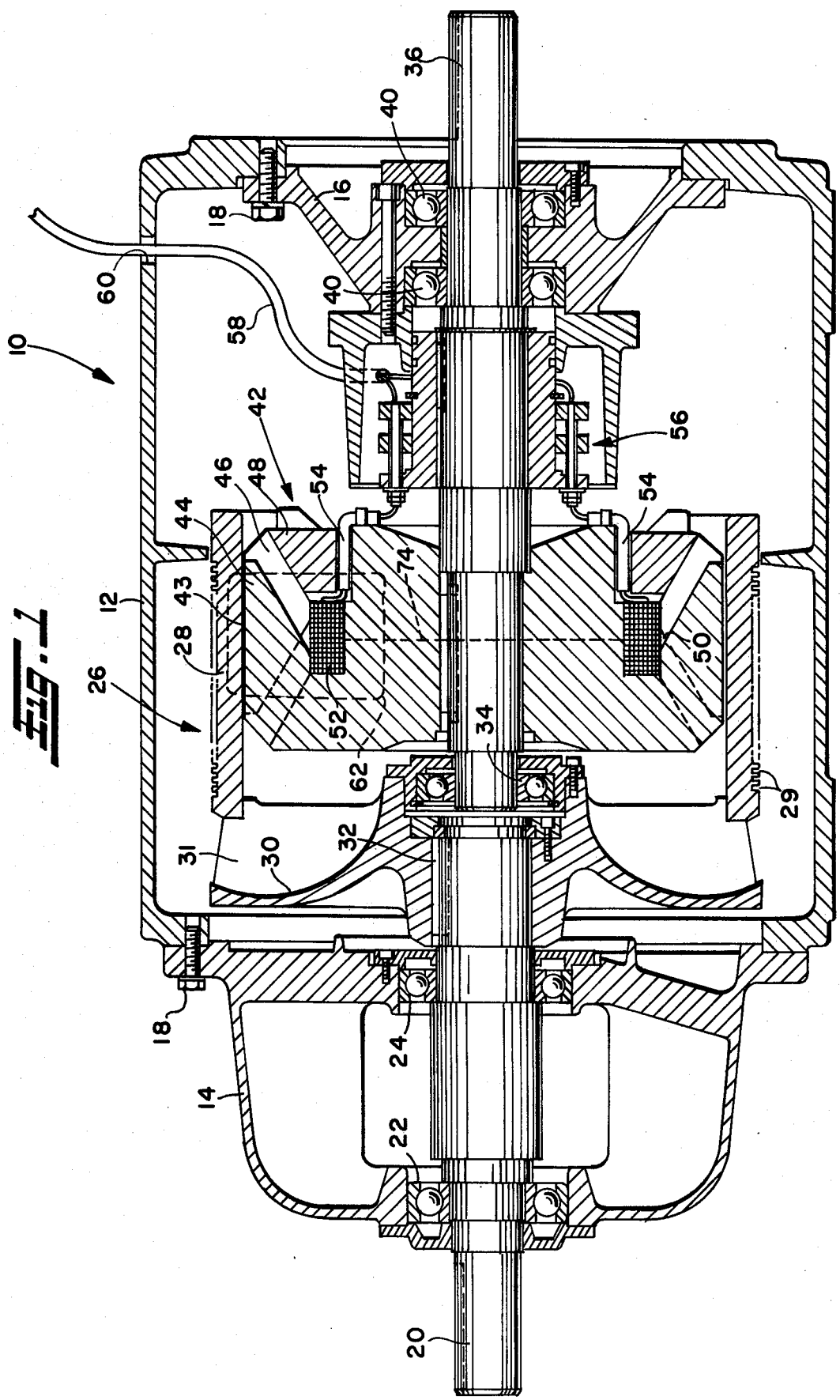

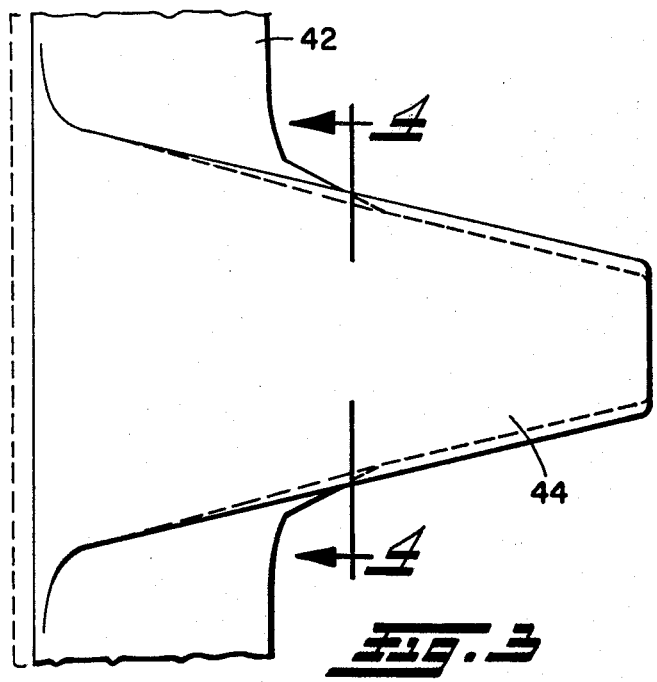
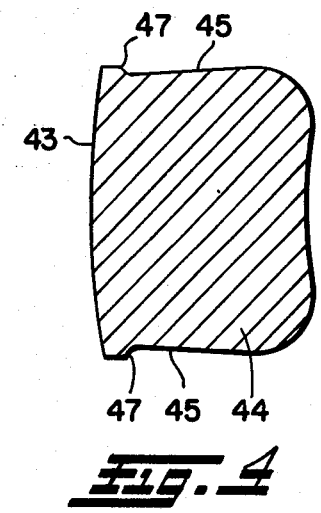
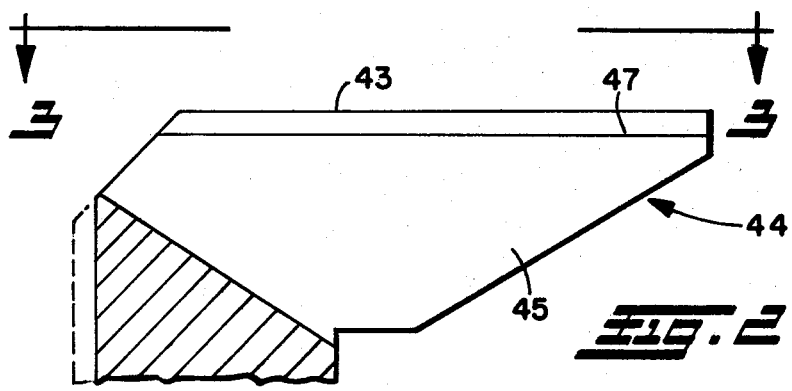
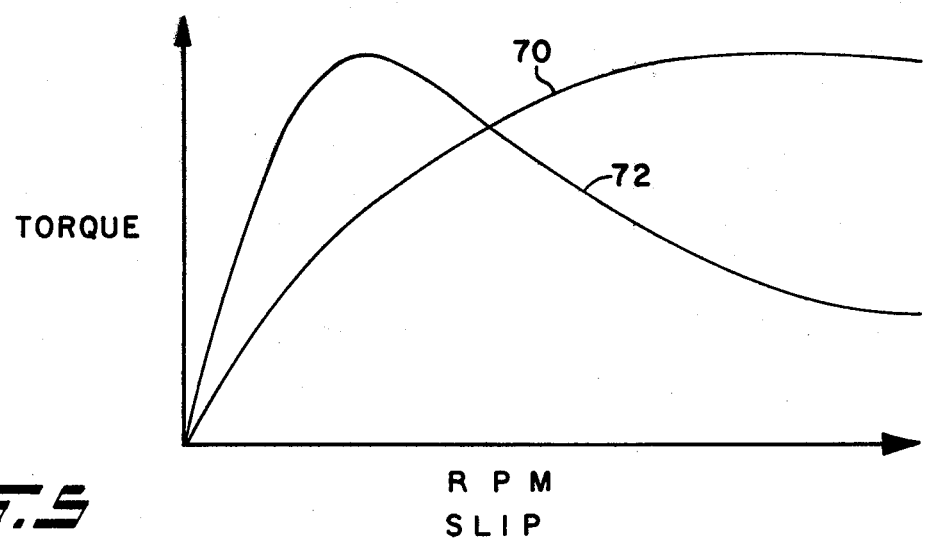

SPREAD POLE EDDY CURRENT COUPLING

BACKGROUND OF THE INVENTION

The present invention relates to an eddy current coupling and more particularly to an eddy current coupling having an interdigitated pole assembly wherein the numerical value of the total face surface area of each of the plurality of pole members is 2.2 to 3 times larger than the numerical value of the crossectional area of the core portion of the pole assembly to reduce the flux density at the pole face to enable the coupling to maximize torque output at low slip speeds.

Eddy current couplings are known in the art. In such known eddy current couplings generally it has been thought that it was desirable to maintain a constant flux density throughout the pole assembly. Hence, the pole teeth on many interdigitated pole members were tapered toward the face surface area to provide for a constant flux flow path from the core of the coil to the face surface area taking into account inter-pole leakage. An example of such a construction is disclosed in the Winther et al. patent entitled "Toroidal Magnet Field for Dynamoelectric Machines," U.S. Pat. No. 2,470,596, and in the Jaeschke patent entitled "Magnetic Pole," U.S. Pat. No. 2,606,948. In such couplings the torque vs. slip curve (as shown at 70 in FIG. 5) rises slowly at low slip and has a relatively flat configuration wherein the output torque is maximized during high slip conditions. The flattened portion of the curve where torque is maximized is desirable in many industrial applications wherein it is desired to operate the coupling over a wide range of relatively high slip speeds with a substantially constant torque output.

In cases where high torque at low slip has been required, a salient pole coupling has been utilized. A salient pole coupling provides high torque at low slip. The torque curve then droops under high slip conditions due to the fact that at high slip the flux emanating from the pole assembly is overcome and cancelled by the flux emanating from the inductor drum. Such a torque transmitting characteristic is desirable in certain industrial situations, such as pump drives or fans wherein the drive is mainly run at low slip conditions wherein maximum torque is desired. However, salient pole couplings require a separate coil on each pole member. This substantially increases the cost of salient pole couplings over interdigitated couplings. Thus, it is desirable to provide an interdigitated coupling with the torque characteristics of a salient pole coupling in certain situations. If such is provided, the interdigitated pole coupling will cost considerably less than the salient pole coupling hence a considerable cost savings will occur.

SUMMARY OF THE INVENTION

The present invention provides a new and improved eddy current coupling including an input member, an output member rotatable relative to the input member, an interdigitated pole assembly associated with one of the input and output members, a field coil surrounding a portion of the interdigitated pole assembly for coupling the input and output members and an inductor member associated with the other of the input and output members. The interdigitated pole assembly includes a core portion which is surrounded by the field coil and a plurality of pole members which extend at one end thereof from the core portion and have a pole face at the opposite end thereof with the pole faces of the plurality of pole members extending in opposite directions in an interdigitated fashion. The total numerical value of the pole face surface area of the plurality of the pole members is equal to between 2.2 and 3 times the numerical value of the crossectional area of the core portion.

The present invention further provides an eddy current coupling including a rotatable input member, an output member rotatable relative to the input member, an interdigitated pole assembly connected to the output member for rotation therewith, and a field coil surrounding a portion of the interdigitated pole assembly. An inductor member is connected to the input member for rotation therewith. The interdigitated pole assembly includes a core portion which is surrounded by the field coil and a plurality of pole members adjacent ones of which form pole pairs. Each of the plurality of pole members extends at one end thereof from the core portion and includes a pole face at the opposite end thereof with the pole faces of the plurality of pole members extending in opposite directions in an interdigitated fashion. The field coil when energized establishes a field which couples the inductor member and the interdigitated pole assembly to thereby couple the input and output members. Energization of the field coil establishes a flux path which passes from the coil, through the core portion of the pole assembly, through one pole member of a pole pair and from the pole face thereof to the inductor member, through the inductor member, through the pole face of the other pole member of the pole pair and back through the other pole member through the core portion of the pole assembly to the coil. The total numerical value as expressed in units squared of the surface area of the plurality of the pole faces is equal to between 2.2 and 3 times the numerical value as expressed in units squared of the area of the core portion of the pole assembly.

DESCRIPTION OF THE DRAWINGS

FIG. 1 is a side cross-sectional view of an eddy current coupling of the present invention.

FIG. 2 is an enlarged fragmentary cross-sectional view of one pole members embodying the present invention.

FIG. 3 is a top view of the pole member of FIG. 2 taken approximately along the lines 3—3 of FIG. 2.

FIG. 4 is a cross-sectional view of the pole member taken approximately along the line 4—4 of FIG. 3.

FIG. 5 is a torque vs. slip curve illustrating the characteristics of the present pole configuration vs. those of prior art pole configurations.

DESCRIPTION OF THE PREFERRED EMBODIMENT

Referring now to the drawings and more particularly to FIG. 1, an electromagnetic eddy current coupling 10 embodying the present invention is illustrated. The eddy current coupling 10 includes a housing 12 having a pair of end plates 14 and 16 suitably secured thereto by the bolts 18. An input shaft 20 is supported for rotation relative to the housing 12 by the bearings 22 and 24. The input shaft 20 may be connected to a suitable source of power such as a motor to effect rotation of the shaft 20 in a well known manner.

Affixed to one end of the shaft 20 for rotation therewith is an inductor drum assembly 26. The inductor drum assembly 26 includes a cylindrical inductor drum member 28 which is supported for rotation by a support member 30 which is keyed to shaft 20 for rotation therewith by a key 32. A bearing 34 is provided to support the support member 30 and the end of shaft 20 for rotation.

An output shaft 36 is supported at one end in the housing 12 by the bearings 34, for rotation relative to the input shaft 20, and at the opposite end by the bearings 40. The output shaft 36 is rotatable relative to the input shaft 20. Keyed to the output shaft for rotation therewith is a pole assembly 42. The pole assembly 42 includes a plurality of interdigitated pole members 44 and 46 which cooperate to form pole pairs. The pole members 46 are disposed on a spider assembly 48 which is secured to the body of the hub portion of the pole assembly 42. It should be appreciated that each of the poles members 44 and 46 extend at one end thereof from the hub portion of the pole assembly 42 and have pole faces 43 at the opposite end thereof. The pole members define a magnetic circuit for coupling the input shaft 20 with the output shaft 36. The pole members 44 and 46 define a cavity 50 in which a field coil 52 is located. A pair of leads 54 for effecting energization of the field coil 52 are directed from the field coil 52 to a slip ring assembly 56. A conductor 58 extends from the slip ring assembly 56 through an opening 60 in the housing 12 to a suitable source of power for effecting energization of the field coil 52.

The field coil 52 is provided for coupling the inductor drum 28 and the pole assembly 42 upon energization of the coil 52 through the leads 54, slip ring assembly 56, and conductor 58. When the coil 52 is energized, an electromagnetic field having a flux path 62 will magnetically couple the rotating inductor drum 28 and the pole assembly 42 to thereby couple the input and output shafts 20, 36. The flux path 62 will pass from the field coil 52 through one of the pole members 44, 46 of a pole pair, through the inductor drum 28, back through the other of pole members 44, 46 of the pole pair, and back to the coil 52. As the inductor drum 28 rotates through the field established by coil 52, the lines of flux will be broken and cause the pole assembly 42 and the output shaft 36 to which it is affixed to rotate in a proportional relationship with the rotation of drum 28. The speed of the output shaft 36 will be dependent upon the speed of the input shaft 20 and the magnitude of the current flow through coil 52. Since there is some slip, the output shaft 36 will rotate at a lower speed than the inductor drum 28. The amount of slippage and, therefore, the speed of the output shaft 36 is controlled by the strength of the field produced by the field coil 52 which is dependent upon the current supplied to the field coil 52. Hence, the output shaft speed 36 may be varied by varying the current in the coil 52.

The slippage between the inductor drum 28 and the pole assembly 42 generates eddy currents in the inductor drum 28. These eddy currents do not do useful work but rather induction heat the iron in the drum 28. The amount of heat generated is proportional to slip. As slip increases, so will the heat generated in the coupling 10. To this end, the present coupling 10 includes means for passing cooling air through the housing 12 to cool the coupling 10. The support member 30 includes a plurality of fins 31 which effect an axial flow of air upon rotation of the support member 30 over the inductor drum 28 and the pole assembly 42 to effect cooling thereof. A plurality of louvers (not illustrated) are provided in the housing 12 to allow egress of the heated air propelled by the fins 31 after the air has passed over the inductor drum 28 and the pole assembly 42 to effect cooling thereof. Additionally, the inductor drum 28 includes a plurality of grooves 29 on the outer circumference thereof to allow the cooling air to penetrate the surface of the inductor drum 28 to enable the drum to more effectively dissipate the heat generated by the eddy currents.

In operation, flux emanates from the pole assembly 42 and from the inductor drum 28. The greater the slip between the inductor drum 28 and the pole assembly 42, the more voltage and thus amperes are developed in the inductor drum 28 and, hence, the greater the flux emanating from the inductor drum 28. Amperes equal ampere turns and thus flux density. By using a pole operating at a low flux density, high torque will be available at low slip speeds and low torque will be available at high slip speeds due to the fact that the inductor drum 28 at relatively high slip speeds will generate eddy current flux that tends to overcome and cancel the flux emanating from the field pole assembly 42. At relatively low slip speeds, the flux emanating from the inductor drum 28 will be small and high torque will be available at the output shaft 36. Thus, the magnetic flux is greater in the inductor drum 28 than in the field pole 42 at high slip speed using low flux density in the pole faces 43. When the flux density in the inductor drum 28 is high, it tends to cancel that leaving the pole resulting in a torque curve which droops at high slip. Using a pole operating at a high flux density, lower torque at lower slip and higher torque at higher slip will occur as the flux is swept through the inductor drum 28 by the pole assembly 42 during rotation. In the case of normal industrial type couplings employing high flux density at the pole faces, the torque curve will rise at low slip and flatten as shown by curve 70 in FIG. 5 at high slip but rarely, if ever, droop as shown by curve 72 at high slip unless saturation occurs. As the eddy currents shift in phase tending to cover the pole, the magnetic flux emanating from the inductor drum 28 will become equal and opposite to that leaving the pole. When the flux in the inductor member 28 as generated by the eddy currents is equal and opposite to that developed by the pole assembly 42, the torque curve will be substantially flat with speed as is illustrated by the flattened portion of the torque curve 70 which occurs during relatively high slip conditions.

In order to reduce the flux density emanating from the poles 44, 46 to obtain a coupling having maximum torque at low slip, it is necessary to spread out the pole face surface area 43 of the pole members 40 and 46. The surface area of the pole members 44, 46 is related to the basic iron in the pole assembly 42. The basic iron is defined as the iron "in the hole" of the coil 52 and is indicated by the dotted lines 74 in FIG. 1 which defines a crossectional plane taken through the basic iron. The basic iron in the present embodiment includes the iron of the shaft 36 due to the fact that the shaft 36 is "in the hole" of coil 52. The basic iron in the hole of the coil 52 is magnetized directly by the coil 52. Associated iron, which is not "in the hole of the coil 52," such as the iron which directs the magnetic flux from the basic iron to the pole faces 43 of the pole members 44 and 46 is magnetized as the result of magnetization of the basic iron. The magnetic flux tends to flow in a circle beginning at the basic iron and passing through the associated iron and one of the pole members of a pole pair through the inductor drum 28 and back through the other pole member of the pole pair and its associated iron back to the basic iron. In order to obtain a torque curve such as the curve 72, it has been found that it is desirable to have the total pole face area of surfaces 43 of the plurality of pole members 44 and 46 as expressed in units of area greater than the crossectional area of the basic iron taken approximately along line 74.

Such a construction of the pole member 44 is illustrated in FIGS. 2-4 which show the detailed construction of a single pole member 44 of a pole pair wherein the pole face surface 43 is enlarged or spread out relative to the pole itself. As is illustrated in FIG. 204, each pole member includes side surfaces 45 which diverge at the portion 47 thereof to spread out the face 43 of the pole member relative to the body of the pole. Thus, as the flux passes through the pole from the basic iron it will spread out to cover the enlarged surface 43 of the pole. The spreading out of the lines of flux will of course decrease the flux density at pole face 43. Preferably, if the basic iron is considered as having a crossectional area of 100 square units then it would be preferable to have the total pole face surface areas 43 of the plurality of poles 44, 46 equal to between 220 and 300 units squared. This is generally a 60% increase in pole area over known eddy current couplings wherein the pole face area was usually 70% smaller as expressed in units squared than the basic iron area as expressed in units squared to enable a constant flux density to prevail in the flux circuit.

The present spread pole design has been developed in order to simulate the torque curve of a salient pole coupling. The torque curve of a salient pole coupling is a drooping torque curve such as that illustrated by the curve 72. Such a torque curve is desirable for pumps and fans which require very little driving torque at low operating speeds (high slip). At higher speeds (low slip), the pump torque requirement increases as the square of its driven speed. As centrifugal pumps and fans have fixed torque requirements, once they are installed, overloads rarely, if ever, occur. Thus, it is desirable to provide means for driving the pump or the equivalent with adequate torque throughout the speed range. It is not advantageous to provide high torque levels for pumps at low coupling output speeds (high slip) as the pump has a low torque requirement. As pump speed nears maximum, so does the torque requirement; thus, it becomes desirable to design a pole configuration which has high torque at high output speeds (low slip).

A conventional industrial eddy current coupling has a high torque requirement throughout the speed range. These industrial torque requirements may occur at any speed depending on the application; thus, it is normal for a supplier of the eddy current equipment to provide a torque curve that is substantially flat throughout the operating ranges, as is illustrated by the curve 70 wherein the operating range of the coupling would be generally on the flat portion of curve 70. Thus, an industrial eddy current coupling, other than the salient pole type, when applied to a pump drive has excess torque capability at low output speeds and is generally not enough torque capacity at top output speeds. Accordingly, it has been necessary in the past to oversize industrial couplings in order to meet pump requirements. The end result is a drive that is inefficient from a material use standpoint. To solve this problem, salient pole couplings have been utilized. However, salient pole couplings are extremely expensive due to the fact that coils must be provided on each pole. The spread pole coupling of the present invention provides a torque curve such as curve 72 where the characteristics are similar to that of a salient pole coupling while avoiding the cost associated therewith.

When calculating the face surface area 43 of poles 44, 46, it is necessary to realize that the larger the surface area of the pole member the less space between adjacent interdigitated pole members and, thus, the greater the interpole leakage. The smaller the distance between adjacent poles the greater the interpole leakage. Increased interpole leakage results in a decrease in efficiency of the coupling. Thus, it has been found desirable to limit the total pole face area 43 of the plurality of pole members to be between 2.2 and 3 times the numerical value of the crossectional area of the basic core iron taken approximately along line 74. The most desirable value for the total pole face area 43 for the plurality of pole members 44, 46 appears to be 2.6 times the numerical value of the area of the basic iron. Such a construction minimizes flux density in the pole face while preventing undesirable flux leakage between adjacent interdigitated pole members which would tend to decrease the efficiency of the present coupling 10.

From the foregoing, it should be apparent that a new and improved coupling has been provided which includes an input member, an output member rotatable relative to the input member, and an interdigitated pole assembly connected to the output member for rotation therewith. A field coil surrounds a portion of the interdigitated pole assembly, and an inductor member is connected to the input member. The interdigitated pole assembly includes a core portion which is surrounded by the field coil and a plurality of pole members which extend at one end thereof from the core portion and have a pole face at the opposite end thereof. The total surface area of the plurality of pole faces of the plurality of pole members is equal to between 2.2 and 3 times the numerical value of the area of the core portion of the pole assembly.

What I claim is:

1. An eddy current coupling comprising an input member, an output member rotatable relative to said input member, an interdigitated pole assembly associated with one of said input and output members, a field coil surrounding a portion of said interdigitated pole assembly for coupling said input and output members, and an inductor member associated with the other of said input and output members, said interdigitated pole assembly including a core portion which is surrounded by said field coil and a plurality of pole members which extend at one end thereof from said core portion and have a pole face at the opposite end thereof with the pole faces of the plurality of pole members extending in opposite directions in an interdigitated fashion, and wherein the numerical value of the total surface area of the plurality of pole faces is equal to between 2.2 and 3 times the numerical value of the area of the core portion of the pole assembly and the cross-sectional area of the iron, through which the lines of magnetic flux pass in each of said pole members, gradually increases between the core portion of the pole assembly and the pole faces of the pole assembly as the cross-sectional area of the iron approaches the pole faces of the pole member.

2. An eddy current coupling as defined in claim 1 wherein said interdigitated pole assembly is connected to said output member for rotation therewith and said field coil is supported by said interdigitated pole assembly for rotation therewith.

3. An eddy current coupling as defined in claim 1 wherein said inductor member includes a cylindrical drum portion which surrounds said pole assembly and is disposed coaxial to the axis of rotation of said pole assembly and a support member connected to the input member for rotation therewith, said support member being connected to one end of said cylindrical drum portion for supporting the cylindrical inductor drum portion for rotation about an axis coaxial with the axis of rotation of said pole assembly.

4. An eddy current coupling as defined as claim 3 where said support member includes fin means disposed thereon for propelling a cooling medium across said cylindrical drum portion and said interdigitated pole assembly to effect cooling of said interdigitated pole assembly and said cylindrical drum portion.

5. An eddy current coupling as defined in claim 4 wherein said cylindrical drum portion includes a plurality of heat dissipating grooves disposed on the outer periphery thereof and in contact with the cooling medium propelled by said fin means on said support member.

6. An eddy current coupling as defined in claim 1 wherein each of said pole members include at least a pair of divergent side surfaces each of which terminate at the pole face and cooperate to define the pole face of the pole member, and wherein the cross sectional area of the iron, through which the lines of magnetic flux pass in each of the pole members, increases as the cross section approaches the pole face of the pole member to thereby decrease the flux density in the magnetic circuit through each pole member as the magnetic circuit approaches the pole face.

7. An eddy current coupling comprising a rotatable input member, an output member rotatable relative to said input member, an interdigitated pole assembly connected to said output member for rotation therewith, a field coil surrounding a portion of said interdigitated pole assembly, and an inductor member connected to said input member for rotation therewith, said interdigitated pole assembly including a core portion which is surrounded by said field coil and a plurality of pole members adjacent ones of which form pole pairs, each of said plurality of pole members extending at one end thereof from said core portion of said pole assembly and having a pole face at the opposite end thereof with the pole faces of the plurality of pole members extending in opposite directions in an interdigitated fashion, said field coil means being adapted to be energized to establish a field for coupling said inductor member and said pole assembly to thereby couple said input and output members, said field coil when energized establishing a flux path which passes from said coil, through said core portion of said pole assembly, through one pole member of a pole pair and from the pole face thereof to said inductor member, through said inductor member to the pole face of the other pole member of the pole pair and back through the other pole member to the core portion of said pole assembly, and wherein the numerical value of the total pole face surface area of said plurality of pole members is equal to between 2.2 and 3 times the numerical value of the area of said core portion and the cross-sectional area of the iron, through which the lines of magnetic flux pass in each of said pole members, gradually increases between the core portion of the pole assembly and the pole faces of the pole assembly as the cross-sectional area of the iron approaches the pole faces of the pole member.

8. An eddy current coupling as defined in claim 7 wherein said field coil is supported by said interdigitated pole assembly for rotation therewith.

9. An eddy current coupling as defined in claim 7 wherein said inductor member includes a cylindrical inductor drum portion which surrounds said pole assembly and is disposed coaxial to the axis of rotation of said interdigitated pole assembly and a support member connected to said input member for rotation therewith, said support member being connected to one end of said cylindrical inductor drum portion for supporting said cylindrical inductor drum portion for rotation about an axis coaxial to the axis of rotation of said interdigitated pole assembly.

10. An eddy current coupling as defined in claim 9 wherein said support member includes fin means disposed thereon for directing a cooling medium over said cylindrical inductor drum portion and said interdigitated pole assembly to dissipate heat generated therein.

11. An eddy current coupling as defined in claim 10 wherein said cylindrical inductor drum portion includes a plurality of grooves disposed on an outer peripheral surface thereof and in contact with the cooling medium directed by said fin means on said support member, said grooves enabling said cooling medium to penetrate said cylindrical inductor drum portion to effect cooling thereof.

12. An eddy current coupling as defined in claim 7 wherein each of said pole members includes at least a pair of divergent side surfaces, each of which terminate at the pole face of the pole member and cooperate to define the pole face, and wherein the cross-sectional area of the iron, through which the lines of flux pass in each of the pole members, increases as the cross section approaches the pole face of the pole member to thereby decrease the flux density in the magnetic circuit through each pole member as the magnetic circuit approaches the pole face.

* * * * *